(12) United States Patent
Kuroda

(10) Patent No.: US 8,550,741 B2
(45) Date of Patent: Oct. 8, 2013

(54) BALL JOINT AND METHOD OF MANUFACTURING SAME

(75) Inventor: Shigeru Kuroda, Yokohama (JP)

(73) Assignee: NHK Spring Co., Ltd., Yokohama (JP)

( * ) Notice: Subject to any disclaimer, the term of this patent is extended or adjusted under 35 U.S.C. 154(b) by 173 days.

(21) Appl. No.: 13/062,046

(22) PCT Filed: Aug. 25, 2009

(86) PCT No.: PCT/JP2009/064750
§ 371 (c)(1),
(2), (4) Date: Mar. 3, 2011

(87) PCT Pub. No.: WO2010/029847
PCT Pub. Date: Mar. 18, 2010

(65) Prior Publication Data
US 2011/0150563 A1    Jun. 23, 2011

(30) Foreign Application Priority Data
Sep. 9, 2008  (JP) .................. 2008-230664

(51) Int. Cl.
*F16C 11/08* (2006.01)
(52) U.S. Cl.
USPC ..................... 403/143; 403/132; 403/135
(58) Field of Classification Search
USPC .............. 403/122, 132, 133, 135, 143
See application file for complete search history.

(56) References Cited

U.S. PATENT DOCUMENTS

| 4,537,524 | A | 8/1985 | Hanson |
| 5,427,467 | A | 6/1995 | Sugiura |
| 5,782,573 | A * | 7/1998 | Dorr et al. ............... 403/135 |
| 6,736,565 | B2 * | 5/2004 | Tamatsu et al. ........... 403/122 |
| 7,040,833 | B2 * | 5/2006 | Kondoh ................... 403/140 |
| 7,090,425 | B2 * | 8/2006 | Bohne et al. ............ 403/135 |
| 2003/0049072 | A1 | 3/2003 | Tamatsu et al. |
| 2004/0258462 | A1 | 12/2004 | Budde |

FOREIGN PATENT DOCUMENTS

| DE | 297 21 050 U1 | 3/1999 |
| DE | 10 2004 014 536 A1 | 10/2005 |
| EP | 0 591 928 A1 | 4/1994 |
| JP | Y1-45-3448 | 2/1970 |
| JP | U-63-48628 | 4/1988 |
| JP | Y2-3-18741 | 4/1991 |
| JP | A-6-117429 | 4/1994 |

(Continued)

OTHER PUBLICATIONS

International Search Report for International Patent Application No. PCT/3P2009/064750, mailed on Oct. 6, 2009.

(Continued)

*Primary Examiner* — Michael P Ferguson
(74) *Attorney, Agent, or Firm* — Oliff & Berridge, PLC

(57) ABSTRACT

A ball joint includes a ball seat, and the ball seat includes a thermal caulking portion for fixing a ball seat to a housing. The ball seat includes a concave portion having an overhang portion for withstanding a pullout load so as to prevent a ball portion from coming off from the concave portion. The concave portion of the ball seat is formed of polyoxymethylene, and the overhang portion and the thermal caulking portion are formed of a resin, in which glass fiber is added to the polyoxymethylene, so as to be strengthened. Consequently, the pullout load can be increased, and the weight of the ball joint is maintained and the production cost is not greatly increased.

7 Claims, 4 Drawing Sheets

(56) References Cited

FOREIGN PATENT DOCUMENTS

| | | |
|---|---|---|
| JP | A-2002-89541 | 3/2002 |
| JP | A-2005-533990 | 11/2005 |
| JP | A-2008-57761 | 3/2008 |
| WO | WO 99/28639 A1 | 6/1999 |

OTHER PUBLICATIONS

Extended European Search Report issued in European Patent Application No. 09 81 2994.3 dated Jun. 1, 2012.

* cited by examiner

BALL JOINT AND METHOD OF MANUFACTURING SAME

TECHNICAL FIELD

The present invention relates to a ball joint, which may be provided for stabilizers of vehicles such as automobiles, and also relates to a production method therefor.

BACKGROUND ART

A ball joint is used for rotatably and swingably connecting two portions that can move relative to each other. For example, in a suspension section of a vehicle, a ball joint is used at a portion connecting a stabilizer and a shock absorber and at a portion connecting a stabilizer and a suspension arm.

The ball joint is equipped with a ball stud, a ball seat, a housing, a support bar, and a dust cover. The ball stud has a stud portion and a ball portion. The ball seat has a bearing function and the ball portion of the ball stud is press-fitted therein. The housing holds the ball seat therein, and the support bar supports the housing. The dust cover prevents entry of foreign matter, which may inhibit sliding and swinging movement of the ball portion of the ball stud in the ball seat. In this ball joint, when pullout force is applied to the ball stud, the ball portion of the ball stud is retained by a portion of a concave portion, which overhangs the ball portion, whereby the concave portion withstands the pullout load in a direction to pull out the ball portion (for example, see Japanese Patent Application Laid-Open No. 2002-89541).

In contrast, in another conventional ball joint, a ball seat made of a resin is backed up by a housing made of steel. Therefore, when pullout force is applied to the ball stud, even in a case of breakage of the ball seat, the housing retains the ball portion of the ball stud and withstands the pullout load (for example, see Japanese Patent Application Laid-Open No. 2008-57761).

In the technique for withstanding the pullout load by the ball seat, when the pullout load is applied to the ball seat, the ball seat may not withstand the pullout load and may thereby be broken or be deformed, whereby the function of the ball joint may be degraded. If the material used for forming the entirety of the ball seat is changed to a material having higher strength, the material having high strength is inevitably exposed to the surface of a portion receiving the ball portion. In this case, the material having high strength damages the surface of the ball portion and decreases the surface roughness of the ball portion or partially abrades the ball portion, whereby the function of the ball portion as a ball joint may be degraded. Accordingly, reliability of the ball joint may be insufficient. In addition, when the material used for forming the entirety of the ball seat is changed to a material having higher strength, the production cost is increased, and reduction of production cost is difficult.

In contrast, in the technique for withstanding the pullout load by the housing made of steel, the number of parts for forming the ball joint is greater than that in the technique for withstanding the pullout load by the ball seat. Accordingly, the production cost and the weight of the ball joint are increased.

DISCLOSURE OF THE INVENTION

An object of the present invention is to provide a ball joint in which a pullout load can be increased while the weight thereof and the production cost are not greatly increased.

In a first aspect of the invention, the present invention provides a ball joint including a ball stud, a ball seat, and a housing. The ball stud has a columnar stud portion and has a ball portion that has a spherical side surface and a center positioned on an axis of the stud portion. The ball seat is made of a resin and has a spherical concave portion into which the ball portion is relatively rotatably and slidably fitted. The housing is formed into a cylindrical shape with a bottom and holds the ball seat therein. The ball seat has a thermal caulking portion for fixing the ball seat to the housing. The concave portion has an overhang portion for withstanding a pullout load so as to prevent the ball portion from coming off therefrom. In the ball seat, the concave portion is formed of a first material, and the overhang portion and the thermal caulking portion are formed of a second material, which has higher strength than that of the first material, so as to be strengthened.

In a second aspect of the invention, the present invention provides a ball joint including a ball stud, a ball seat, and a housing. The ball stud has a columnar stud portion and has a ball portion that has a spherical side surface and a center positioned on an axis of the stud portion. The ball seat is made of a resin and has a spherical concave portion into which the ball portion is relatively rotatably and slidably fitted. The housing is formed into a cylindrical shape with a bottom and holds the ball seat therein. The ball seat has a thermal caulking portion for fixing the ball seat to the housing. The concave portion has an overhang portion for withstanding a pullout load so as to prevent the ball portion from coming off therefrom. The concave portion of the ball seat is made of a first material, and the ball seat withstands the pullout load by a second material having higher strength than that of the first material.

According to the present invention, when the concave portion receives the pullout load, the overhang portion, which is strengthened, withstands the pullout load and prevents the ball portion from coming off from the concave portion. Moreover, when the ball seat receives the pullout load, the thermal caulking portion, which is strengthened, withstands the pullout load and prevents the ball seat from coming off from the housing. As a result, the overhang portion and the thermal caulking portion of the ball joint prevent damage to the ball joint, whereby the reliability of the ball joint is improved.

As the first material of the present invention, polyoxymethylene (POM), polypropylene (PP), polytetrafluoroethylene (PTFE), polybutylene terephthalate (PBT), polyether ether ketone (PEEK), etc. may be mentioned. As the second material of the present invention, resins obtained by adding glass fiber (GF), carbon fiber (CF), or the like, to polyoxymethylene (POM), polypropylene (PP), polytetrafluoroethylene (PTFE), polybutylene terephthalate (PBT), polyether ether ketone (PEEK), etc. may be mentioned. Since the second material is a resin in which glass fiber (GF), carbon fiber (CF), or the like, is added, the production cost of the ball joint can be reduced compared to the case using a resin having high strength as the second material. The amount of glass fiber (GF), carbon fiber (CF), or the like, is preferably set to be approximately 10 to 25%. By using such an amount of glass fiber (GF), carbon fiber (CF), or the like, the production cost of the ball joint can be reduced while the strength of the ball seat is maintained. It should be noted that the pullout load is a load applied in a direction in which the ball portion will come off from the concave portion.

In the present invention, a part or entirety of the overhang portion and the thermal caulking portion may be formed of the second material so as to withstand the pullout load. For example, a part of the overhang portion is formed of the first material, and the rest of the overhang portion is formed of the second material. Moreover, for example, a part of the thermal caulking portion is formed of the first material, and the rest of the thermal caulking portion is formed of the second material.

In the present invention, the ball seat desirably has a holding portion which is formed of the second material and is closely adhered to the outside of the concave portion so as to cover the outside of the concave portion. According to this aspect, the holding portion having greater strength than that of the concave portion do not contact the ball portion. Therefore, the surface roughness of the ball portion is not decreased, and the ball portion is not partially abraded, whereby damage to the ball portion is prevented. As a result, decrease of the function of the ball joint is prevented, whereby the reliability of the ball joint is improved.

In the present invention, the concave portion has an inner diameter at the center of the ball portion, and the inner diameter is desirably greater than the diameter of the opening portion of the concave portion. According to this aspect, when the concave portion receives the pullout load, the holding portion retains the concave portion. Specifically, when the concave portion receives the pullout load, the holding portion inhibits movement of the concave portion and prevents the concave portion from coming off from the holding portion. As a result, damage to the ball seat is prevented, whereby the reliability of the ball joint is improved.

In the present invention, the holding portion desirably has a backup portion for reinforcing the overhang portion, and the backup portion desirably has plural convex portions which are provided by forming plural slits in a circumferential direction of the concave portion. According to this aspect, in a case of pressing the ball portion of the ball stud into the concave portion of the ball seat, the opening portion of the ball seat is widely opened because the backup portion can expand, whereby the ball portion is pressed into the concave portion.

In the present invention, the thermal caulking portion is desirably made of the second material, and the thermal caulking potion and the holding portion are desirably integrally formed. According to this aspect, the strength of the entirety of the ball seat is improved with respect to the pullout load.

In the present invention, it is desirable that the ball seat be made of the first material and have a flange portion for holding and securing a dust cover between the ball seat and the housing. Moreover, the concave portion and the flange portion are, desirably, integrally formed. According to this aspect, when the concave portion receives the pullout load, damage to the concave portion is prevented, whereby coming off of the dust cover is prevented. In addition, when the concave portion receives the pullout load, the concave portion is prevented from coming off from the holding portion even if the first material and the second material are separated at the boundary thereof.

In the present invention, the holding portion is desirably formed so that the cross section area of the holding portion is equal or greater than the total cross section area of the thermal caulking portion in a lateral direction with respect to the height direction of the concave portion. According to this aspect, the strength of the holding portion is improved, whereby damage to the holding portion is prevented when the pullout load is applied.

In the present invention, the convex portion is desirably formed so that the ratio of the height to the width of the convex portion is not less than 1.0 and not greater than 2.0. According to this aspect, the strength of the backup portion is improved while the elasticity of the backup portion is maintained.

In the present invention, the concave portion is desirably provided with a protruding portion, and the concave portion and the protruding portion are desirably integrally formed. In addition, the protruding portion desirably closely fits to the slit. According to this aspect, the concave portion engages with the holding portion, whereby rotating and shifting of the concave portion are prevented.

The present invention provides a production method for a ball joint including a ball stud having a ball portion, a ball seat having a ball receiving portion and a reinforcing portion, and a housing having a holding portion. The ball receiving portion has a flange portion, a concave portion, and a protruding portion. The reinforcing portion has a thermal caulking portion and a holding portion so as to hold the ball receiving portion. In the present invention, the production method includes: a first injection molding step for integrally forming the ball receiving portion by using a resin of a first material by injection; a second injection molding step for integrally forming the reinforcing portion so as to form the ball seat by using a resin of a second material, the second material having greater strength than that of the first material; a fitting step for fitting the ball stud into the concave portion; and a fixing step for pressing the ball seat into the holding portion of the housing so as to fix the ball seat.

According to the present invention, when the concave portion receives the pullout load, the overhang portion, which is strengthened, withstands the pullout load and prevents the ball portion from coming off from the concave portion. Moreover, when the ball seat receives the pullout load, the thermal caulking portion, which is strengthened, withstands the pullout load and prevents the ball seat from coming off from the housing. As a result, the overhang portion and the thermal caulking portion of the ball joint prevent damage to the ball joint, whereby the reliability of the ball joint is improved.

EFFECT OF THE INVENTION

According to the present invention, a ball joint, in which the pullout load can be increased, can be produced while the weight thereof and the production cost are not greatly increased.

Figure 1:
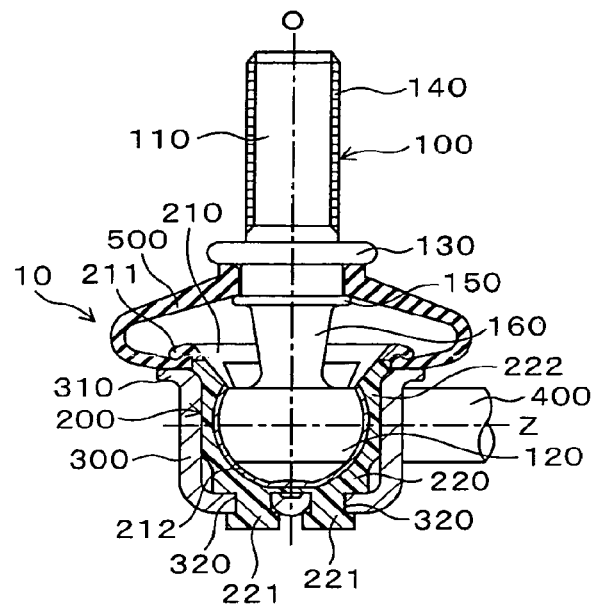
FIG. 1 is a cross section showing a ball joint.

REFERENCE NUMERALS 10 denotes a ball joint, 100 denotes a ball stud, 110 denotes a stud portion, 120 denotes a ball portion, 200 denotes a ball seat, 211 denotes a flange portion, 212 denotes a concave portion, 212b denotes an overhang portion, 213 denotes a protruding portion, 220 denotes a reinforcing portion, 221 denotes a thermal caulking portion, 222 denotes a holding portion, 222b denotes a backup portion, 222d denotes a slit, 300 denotes a housing, 330 denotes a holding portion, and 500 denotes a dust cover.

BEST MODE FOR CARRYING OUT THE INVENTION

Structure of Ball Joint

Figure 2:
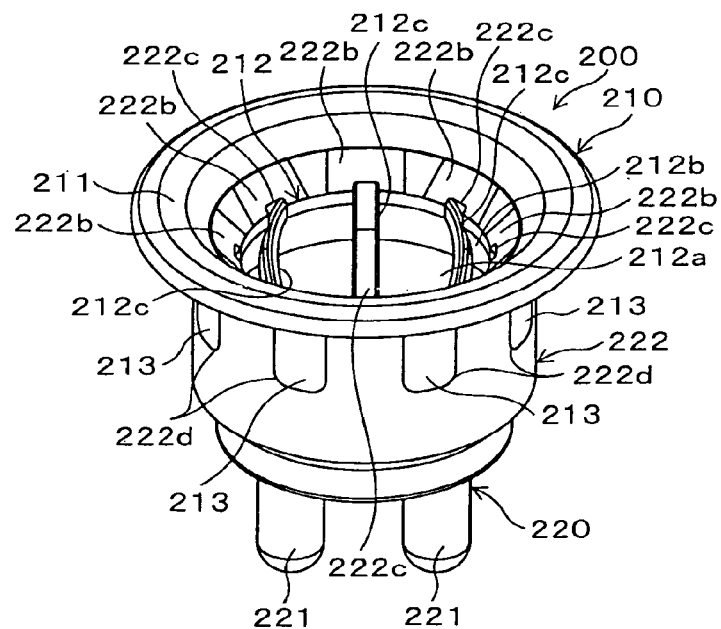
FIG. 2 is a perspective view showing a ball seat.
Figure 3:
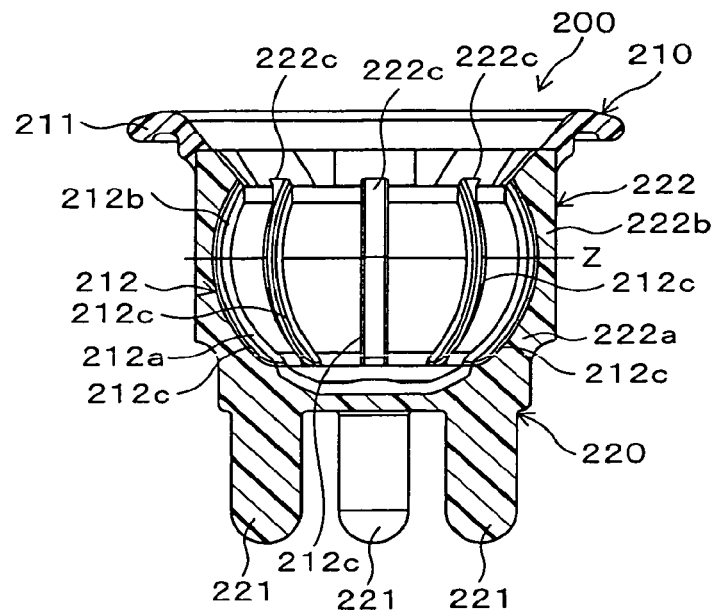
FIG. 3 is a longitudinal cross section showing a ball seat.
Figure 4:
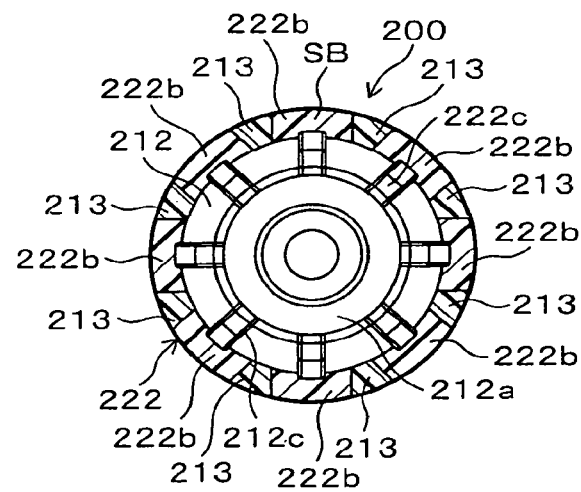
FIG. 4 is a transverse cross section showing a ball seat.
Figure 5:
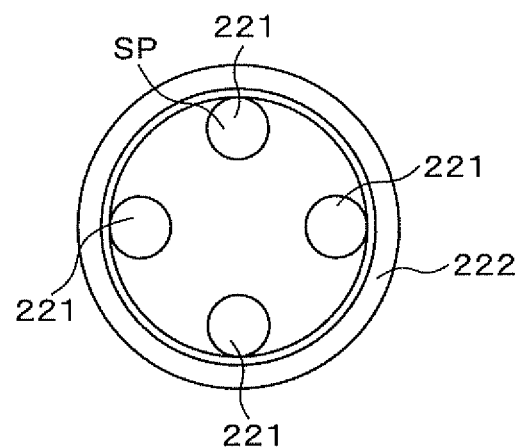
FIG. 5 is a view showing a reinforcing portion viewed from the bottom.
Figure 6:
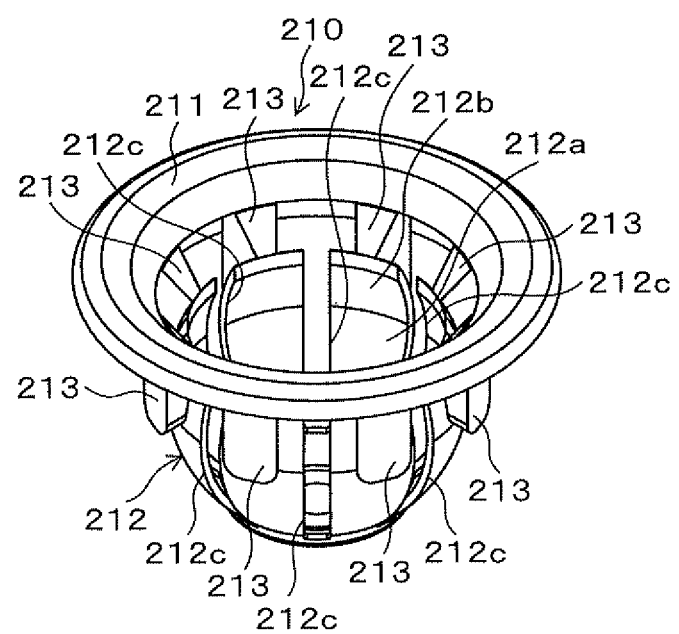
FIG. 6 is a perspective view showing a ball receiving portion.
Figure 7:
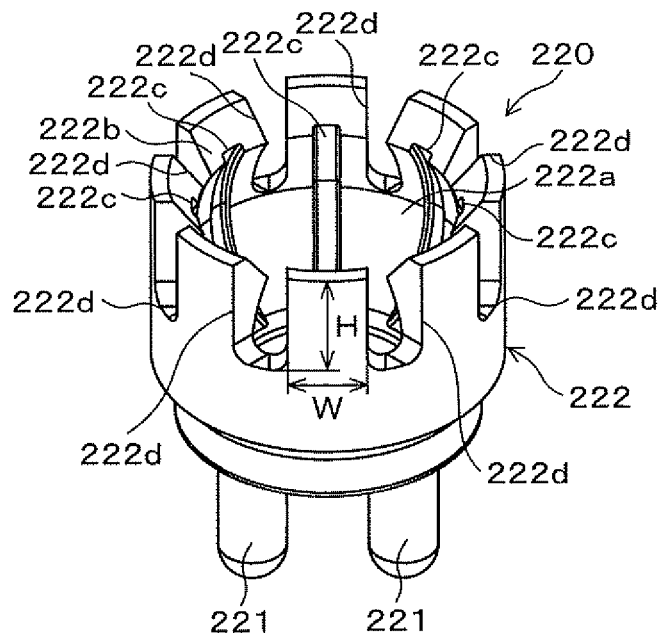
FIG. 7 is a perspective view showing a reinforcing portion.

An embodiment of the present invention will be described with reference to the drawings hereinafter. FIG. 1 is a cross section showing a ball joint. FIG. 2 is a perspective view showing a ball seat. FIG. 3 is a longitudinal cross section showing a ball seat. FIG. 4 is a transverse cross section showing a ball seat. FIG. 5 is a view showing a reinforcing portion, viewed from the bottom. FIG. 6 is a perspective view showing a ball receiving portion. FIG. 7 is a perspective view showing a reinforcing portion.

As shown in FIG. 1, a ball joint 10 is equipped with a ball stud 100, a ball seat 200, a housing 300, a support bar 400, and a dust cover 500. The ball joint 10 has the ball stud 100, the ball seat 200, the housing 300, and the support bar 400 as main components. The ball seat 200 universally and pivotally supports the ball stud 100. The ball joint 10 is secured to a plate-like mounting member (not shown in the figures). The ball joint 10 may be used for a connecting portion of a stabilizer.

The ball stud 100 is made of metal and is integrally formed. As shown in FIG. 1, the ball stud 100 has a stud portion 110, a ball portion 120, a flange portion 130, a screw portion 140, a protruding portion 150, and a tapered portion 160. In the ball stud 100, the ball portion 120 having a spherical side surface is formed at an end portion of the columnar stud portion 110. The ball portion 120 has a center positioned on an axis O of the stud portion 110. On the ball stud 100, the flange portion 130 having a flange shape is formed at an axis O direction middle portion of the stud portion 110, and the protruding portion 150 is formed for prevention of movement of the dust cover 500. On the ball stud 100, the screw portion 140 is formed at a circumferential surface of a leading end side from the flange portion 130 of the stud portion 110 (that is, a peripheral surface of a side opposite to the ball portion 120), and the tapered portion 160 is formed at a side of the ball portion 120.

The ball stud 100 is fastened as follows. The leading end portion of the ball stud 100, at which the screw portion 140 is formed, is penetrated into a hole that is formed at the mounting member (not shown in the figures). A nut (not shown in the figures) is screwed to the screw portion 140, so that the leading end portion of the ball stud 100 is secured to the mounting member. Thus, the flange portion 130 of the ball stud 100 and the nut hold the mounting member, so that the ball stud 100 is fastened.

The ball seat 200 is formed of a resin. As shown in FIGS. 1 and 3, the ball seat 200 has a ball receiving portion 210 and a reinforcing portion 220. The ball seat 200 is formed into a cylindrical shape with a bottom and has an opening portion and a bottom portion due to the ball receiving portion 210 and the reinforcing portion 220. The ball seat 200 is held in the housing 300. The ball seat 200 universally, that is, swingably and pivotally, supports the ball stud 100 around the ball portion 120.

As shown in FIG. 6, the ball receiving portion 210 has a flange portion 211, a concave portion 212, and protruding portions 213. The ball receiving portion 210 is formed of polyoxymethylene (POM) which is an example of the first material. That is, the flange portion 211, the concave portion 212, and the protruding portions 213 are integrally formed by using polyoxymethylene (POM).

As shown in FIG. 1, the flange portion 211 is provided at the opening side of the ball receiving portion 210. The flange portion 211 is formed into a flange shape toward the outside of the ball receiving portion 210. The flange portion 211 holds an end edge of the greater diameter side of the dust cover 500 between the flange portion 211 and a flange portion 310 of the housing 300, thereby securing the dust cover 500. The flange portion 310 of the housing 300 will be described later.

The inside of the concave portion 212 has a spherical shape so as to have the same shape as the shape of the side surface of the ball portion 120, as shown in FIGS. 1 and 3. The outside of the concave portion 212 has a spherical shape so as to have a similar shape as the shape of the inside of the concave portion 212. That is, the inner diameter of the concave portion 212 at the center Z of the ball portion 120 is formed so as to be greater than the diameter of the opening portion of the concave portion 212. The concave portion 212 has a receiving portion 212a, an overhang portion 212b, and grease grooves 212c. The ball portion 120 of the ball stud 100 is slidably fitted to the concave portion 212. Therefore, the ball stud 100 is universally, that is, swingably and pivotally, supported around the ball portion 120 with respect to the ball seat 200.

The receiving portion 212a is provided at the side from the center Z of the ball portion 120 to the bottom side of the concave portion 212, as shown in FIGS. 1 and 3. The receiving portion 212a is formed into a shape that is similar to the shape of the side surface of the ball portion 120 from the center Z of the ball portion 120 to the bottom end of the ball portion 120. That is, the receiving portion 212a is formed into a semispherical shape. The receiving portion 212a receives pressure when the ball stud 100 is pressed toward the bottom side of the ball seat 200.

The overhang portion 212b is provided at the side from the center Z of the ball portion 120 at the opening side of the concave portion 212, as shown in FIGS. 1 and 3. The overhang portion 212b is formed into a shape that is similar to the shape of the side surface from the center Z of the ball portion 120 to the stud portion 110. That is, the overhang portion 212b overhangs the ball portion 120. Therefore, when the pullout force is applied to the ball stud 100 and thereby the overhang portion 212b receives the pullout load, the overhang portion 212b withstands the pullout load and prevents the ball portion 120 from coming off from the concave portion 212.

As shown in FIGS. 2 and 6, plural grease grooves 212c are provided at the concave portion 212 in the circumferential direction at predetermined spaces. The grease grooves 212c are provided so as to extend from the bottom side to the opening side of the concave portion 212. That is, the grease grooves 212c are provided so as to range over the receiving portion 212a and the overhang portion 212b. In this embodiment, eight grease grooves 212c are provided. The number of the grease grooves 212c is not limited to the number in this embodiment and may be suitably selected. The grease grooves 212c are paths so that grease, which is filled in the insides of the concave portion 212 and the dust cover 500, can move in a space formed at the top and the bottom of the ball portion 120. Accordingly, the grease grooves 212c facilitate a heat cycle in which the grease absorbs heat and radiates the heat, and absorbs heat again.

As shown in FIG. 6, plural protruding portions 213 are provided at the outer circumferential side at the opening side of the concave portion 212 at predetermined spaces. The protruding portion 213 is provided at the middle of the adjacent grease grooves 212c of the concave portion 212. In this embodiment, eight protruding portions 213 are provided. The number of the protruding portions 213 is not limited to the number in this embodiment, and it may be suitably selected. The protruding portions 213 connect the flange portion 211 and the concave portion 212. That is, the flange portion 211 and the concave portion 212 are integrally formed via the protruding portions 213.

The reinforcing portion 220 has thermal caulking portions 221 and a holding portion 222, as shown in FIG. 7. The reinforcing portion 220 is formed of a resin in which glass fiber (GF) is added to polyoxymethylene (POM). This resin has greater strength than that of the polyoxymethylene (POM) and is an example of the second material. That is, the thermal caulking portions 221 and the holding portion 222 are integrally formed of the resin in which glass fiber (GF) is added to polyoxymethylene (POM). Therefore, the overall strength of the ball seat 200 is improved with respect to the pullout load.

As shown in FIG. 5, plural thermal caulking portions 221 are provided to the outside of the bottom surface of the holding portion 222. In this embodiment, four thermal caulking portions 221 are provided. The thermal caulking portions 221 are inserted into holes 320 of the housing 300, and the holes 320 of the housing 300 will be described later. The thermal caulking portions 221 are thermally caulked in a condition in which the thermal caulking portions 221 are inserted in the holes 320, whereby the ball seat 200 is fixed to the housing 300. That is, the ball seat 200 is fixed to the housing 300 by thermally caulking the thermal caulking portions 221 in a condition in which the thermal caulking portions 221 are fitted to the holes 320 of the housing 300.

The thermal caulking portions 221 are formed of a resin in which glass fiber (OF) is added to polyoxymethylene (POM). That is, the thermal caulking portions 221 are portions to which a tensile load is applied by the effect of the pullout load, and therefore, the thermal caulking portions 221 are strengthened. Accordingly, when the ball seat 200 receives the pullout load, the thermal caulking portions 221 withstand the pullout load and prevents the ball seat 200 from coming off from the housing 300. As a result, breakage of the ball joint 10 is prevented, whereby the reliability of the ball joint 10 is improved.

The holding portion 222 covers the outside of the concave portion 212 by closely adhering, as shown in FIGS. 1 and 3. Therefore, the holding portion 222 having higher strength than that of the concave portion 212 do not contact the ball portion 120, whereby the surface roughness of the ball portion 120 is not decreased and is not partially abraded. Accordingly, damage to the ball portion 120 is prevented. As a result, decrease of the function of the ball joint 10 is prevented, whereby the reliability of the ball joint 10 is improved.

Since the holding portion 222 covers the outside of the concave portion 212 by closely adhering, the inside of the holding portion 222 has the same spherical shape as the shape of the outside of the concave portion 212. Therefore, when the concave portion 212 receives the pullout load, the holding portion 222 holds the concave portion 212 of the ball receiving portion 210. Specifically, when the concave portion 212 receives the pullout load, the holding portion 222 prevents shift of the concave portion 212 and prevents the concave portion 212 from coming off from the holding portion 222. As a result, breakage of the ball seat 200 is prevented, whereby the reliability of the ball joint 10 is improved.

The outside of the holding portion 222 has a cylindrical shape with a bottom so as to be pressed into the inside of a holding portion 330 of the housing 300, as shown in FIGS. 3 and 7. The holding portion 330 of the housing 300 will be described later. The holding portion 222 has a supporting portion 222a, a backup portion 222b, groove portions 222c, and slits 222d. The holding portion 222 holds the concave portion 212 of the ball receiving portion 210.

The supporting portion 222a is provided to the side from the center Z of the ball portion 120 to the bottom side of the holding portion 222. The inside of the supporting portion 222a has a similar shape as the outside shape of the concave portion 212 from the bottom surface of the concave portion 212 to the center Z of the ball portion 120. The supporting portion 222a supports the receiving portion 212a of the ball receiving portion 210. The outside of the bottom surface of the supporting portion 222a is provided with the thermal caulking portions 221.

The backup portion 222b is provided at the side from the center Z of the ball portion 120 to the opening side of the holding portion 222. The backup portion 222b overhangs the overhang portion 212b. That is, the backup portion 222b reinforces the overhang portion 212b, which is a portion that directly receives the pullout load. Therefore, when the overhang portion 212b of the concave portion 222 receives the pullout load, the backup portion 222b withstands the pullout load and prevents the ball portion 120 from coming off from the concave portion 212. As a result, breakage of the ball joint 10 is prevented, whereby the reliability of the ball joint 10 is improved.

The backup portion 222b reinforces the overhang portion 212b, and the flange portion 211 and the concave portion 212 are integrally formed. Therefore, when the concave portion 212 receives the pullout load, damage to the concave portion 212 is prevented, whereby coming off of the dust cover is prevented. Moreover, when the concave portion 212 receives the pullout load, the concave portion 212 is prevented from coming off from the holding portion 222 even if the concave portion 212 is separated at the boundary between the ball receiving portion 210 and the reinforcing portion 220.

The backup portion 222b is provided with plural slits 222d and is thereby formed with plural convex portions, as shown in FIG. 7. Therefore, the opening portion of the ball seat 200 can widely open in a way such that the backup portion 222b expands. Accordingly, the ball portion 120 of the ball stud 100 can be pressed into the concave portion 212 of the ball seat 200. In addition, when the ball seat 200 having the ball receiving portion 210 and the holding portion 222 is molded by putting a core in the concave portion 212 of the ball receiving portion 210, the core can be pulled out from the concave portion 212.

The backup portion 222b withstands the pullout load and prevents the ball portion 120 from coming off from the concave portion 212 even when plural convex portions are formed. Specifically, the ball portion 120 of the ball stud 100 is fitted to the concave portion 212 of the ball seat 200, and then the ball seat 200 is pressed into the holding portion 330 of the housing 300. The holding portion 330 of the housing 300 will be described later. Therefore, the outer diameter of the backup portion 222b is controlled by the housing 300, whereby the backup portion 222b will not be able to be expanded, and the opening portion of the ball seat 200 will not be widely opened. Accordingly, the backup portion 222b withstands the pullout load and prevents the ball portion 120 from coming off from the concave portion 212.

The convex portion is provided around the groove 222c, as shown in FIG. 7. The convex portion has a width W that is formed so as to uniformly extend to both sides around the groove 222c. The convex portion has a height H that is formed so as to have a height from the center Z to the opening portion of the ball portion 120. It should be noted that the height H of the convex portion is not limited to the height in this embodiment and may be suitably changed as long as the ball portion 120 is fitted to the concave portion 212 while the stiffness of the convex portion is secured. The convex portions are provided in the same number as that of the groove portions 222c. In this embodiment, eight convex portions are formed.

The height H and the width W of the convex portion are constructed so as to satisfy the following first formula.

First Formula 1.0 ≤ height H of the convex portion/width W of the convex portion ≤ 2.0

In this embodiment, the height H of the convex portion is formed to be approximately 7 mm. The width W of the convex portion is formed to be approximately 4 mm. By setting the height H and the width W of the convex portion so as to satisfy the first formula, the strength of the backup portion 222b is improved, and the elasticity of the backup portion 222b is maintained.

In a lateral direction with respect to the height direction of the concave portion 212, the cross section area of the smallest portion of the holding portion 222 and the total cross section area of the thermal caulking portion 221 are set so as to satisfy the following second formula. In addition, the width W of the convex portion is formed so as to satisfy the following second formula.

Second Formula

Total cross section area of the thermal caulking portion 221 ≤ Cross section area of the holding portion 222

In this embodiment, the cross section area of the smallest portion of the holding portion 222 corresponds to an area having eight cross section areas SD of the convex portions. On the other hand, the total cross section area of the thermal caulking portion 221 corresponds to an area having four cross section areas SP of the thermal caulking portions 221. By setting the cross section area of the smallest portion of the holding portion 222 and the total cross section area of the thermal caulking portion 221 so as to satisfy the second formula, the strength of the holding portion 222 is improved. Accordingly, damage to the backup portion 222b of the holding portion 222 is prevented when the holding portion 222 receives the pullout load.

The protruding portion 213 of the ball receiving portion 210 is fitted to the slit 222d of the reinforcing portion 220. Therefore, the concave portion 212 engages with the holding portion 222, thereby preventing rotating and shifting of the concave portion 212. The outer circumference of the ball seat 200 has an exposed portion of the ball receiving portion 210. Therefore, the torque of the ball joint 10, which is used for sliding the ball portion 120, is adjusted by the fitting portion of the housing 300 and the ball seat 200.

The groove portion 222c is provided to the inside of the holding portion 222 so as to overlap the grease groove 212c of the concave portion 212. The groove portion 222e is provided so as to extend from the bottom side to the opening side of the holding portion 222. That is, the groove portion 222c is provided so as to range over the supporting portion 222a and the backup portion 222b. In this embodiment, eight groove portions 222c are provided. The groove portions 222c are paths so that grease, which is filled in the inside of the concave portion 212 and the dust cover 500, moves in the space formed at the top and the bottom of the ball portion 120. Therefore, the groove portions 222c facilitate a heat cycle in which the grease absorbs heat and radiates the heat, and absorbs heat again. That is, the grease grooves 212c and the groove portions 222c are grease flow passageways for circulating the grease.

In the grease flow passageway, since the grease grooves 212c are provided to the concave portion 212, the concave portion 212 is not covered with the holding portion 222. Therefore, the groove portions 222c are provided to the holding portion 222 so that the holding portion 222 do not contact the ball portion 120. That is, by using the grease flow passageway of the ball seat 200, the holding portion 222 is prevented from directly contacting the ball portion 120.

The housing 300 is formed into a cylindrical shape with a bottom having an opening portion and a bottom portion, as shown in FIG. 1. Therefore, the ball seat 200, in which the ball portion 120 is fitted to the concave portion 212, is pressed from the opening portion of the housing 300 to the housing 300. When the ball seat 200 receives the pullout load, the housing 300 at the side from the center Z to the opening side of the ball portion 120 do not resist the pullout load via the ball seat 200.

The housing 300 is made of metal and is integrally formed. The housing 300 has a flange portion 310, holes 320, and a holding portion 330 for holding the ball seat 200 inside thereof. The flange portion 310 is provided at the opening side of the housing 300. The flange portion 310 is formed into a flange shape toward the outside of the housing 300. The holes 320 are provided to the bottom surface of the housing 300. In this embodiment, four holes 320 are formed at the bottom surface. An end of the support bar 400 extending in the radial direction of the housing 300 is firmly fixed to the outer circumferential surface of the housing 300. The housing 300 holds the ball seat 200.

The dust cover 500 is made of rubber and is formed into a lamp shade shape, as shown in FIG. 1. In the dust cover 500, an end edge at the greater diameter side is held between the flange portion 211 of the ball seat 200 and the flange portion 310 of the housing 300 and is secured. In addition, an end edge at the smaller diameter side is hooked to the flange portion 130 of the ball stud 100, whereby this end edge is prevented from shifting to the protruding portion 150 and is secured. Therefore, sealing characteristics are secured by the dust cover 500, whereby the dust cover 500 prevents entry of dust into the concave portion 212 of the ball seat 200.

Production Method for the Ball Joint

Figure 8:
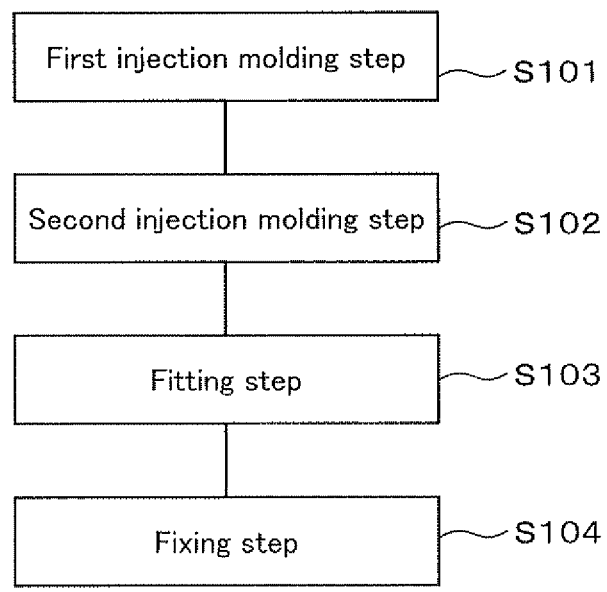
FIG. 8 is a flow chart showing steps of a production method for a ball joint.

Next, an example of a production method for the ball joint 10 will be described with reference to the drawings. FIG. 8 is a flow chart showing steps of a production method for a ball joint.

First, an injection molding step for forming the ball seat 200 is performed. Specifically, a first injection molding step (S101) for integrally forming the ball receiving portion 210 by using polyoxymethylene (POM) is performed. The ball receiving portion 210 has the flange portion 211, the concave portion 212, and the protruding portions 213. Then, a second injection molding step (S102) for integrally forming the reinforcing portion 220 by using a resin is performed. This resin is made by adding glass fiber (GF) to polyoxymethylene (POM). The reinforcing portion 220 is formed so as to hold the ball receiving portion 210 and has the thermal caulking portion 221 and the holding portion 222. In this case, the resin of the ball receiving portion 210 and the resin of the reinforcing portion 220 are not chemically fused.

After the second injection molding step, a core is pulled out from the concave portion 212 of the ball receiving portion 210. Then, a fitting step (S103) for fitting the ball stud 100 having the ball portion 120 into the concave portion 212 of the ball seat 200 is performed.

Finally, a fixing step (S104) for pressing the ball seat 200 into the holding portion 330 of the housing 300 so as to fix the ball seat 200 is performed. The ball seat 200, in which the ball portion 120 of the ball stud 100 is fitted into the concave portion 212 of the ball seat 200, is pressed into the holding portion 330 of the housing 300 in the fixing step. The thermal caulking portions 213 of the ball seat 200 are inserted to the holes 320 formed at the bottom surface of the housing 300. Then, the thermal caulking portions 213 are thermally caulked.

In the ball joint obtained by this production method, when the overhang portion 212b of the concave portion 212 receives the pullout load, the backup portion 222b withstands the pullout load and prevents the ball portion 120 from coming off from the concave portion 212. Moreover, when the ball seat 210 receives the pullout load, the thermal caulking portions 221 withstand the pullout load and prevent the ball seat 210 from coming off from the housing 300. Consequently, breakage of the ball joint 10 is prevented, whereby the reliability of the ball joint 10 is improved.

INDUSTRIAL APPLICABILITY

The present invention can be used in stabilizers mounted to vehicles such as automobiles.

The invention claimed is:

1. A ball joint comprising:
   a ball stud having a columnar stud portion and a ball portion that has a spherical side surface and a center positioned on an axis of the stud portion;
   a ball seat made of a resin and comprising a spherical concave bearing member having an inner concave bearing surface into which the ball portion is relatively rotatably and slidably fitted, and a substantially cylindrical holding member having an inner concave holding surface receiving a spherical outer circumferential portion of the concave bearing member; and
   a housing having a cylindrical cavity with a bottom surface having a through hole and holding the ball seat therein;
   the concave bearing member having an opening portion and comprising a plurality of circumferentially spaced resilient overhang members defining the concave inner bearing surface, the ball portion being inserted into the opening portion, the overhang members being integrally formed with the spherical outer circumferential portion of the concave bearing member and projecting toward a center of the opening portion, thereby resiliently withstanding a pullout load so as to prevent the ball portion from coming out therefrom;
   the holding member having an outwardly projecting thermal caulking member formed at a bottom portion of the holding member, the thermal caulking member being inserted through the through hole of the housing and thermally deformed, thereby fixing the ball seat to the housing;
   the concave bearing member being formed of a first resin material, and the holding member being formed of a second resin material, which has higher strength than that of the first material; and
   the holding member having a backup portion defining the inner concave holding surface and comprising a plurality of convex backup members which are formed by a plurality of slits extending in axial direction of the ball seat and arranged apart from each other in a circumferential direction of the holding member, wherein each convex backup member is closely adhered to an outer circumferential surface of a respective overhang member so as to cover and reinforce a portion of the overhang member.

2. The ball joint according to claim 1, wherein the concave bearing member has an inner diameter at the center of the ball portion, and the inner diameter is greater than the diameter of the opening portion of the concave bearing member.

3. The ball joint according to claim 2, wherein the ball seat has a flange portion for holding and securing a dust cover between the ball seat and the housing, and the concave bearing member and the flange portion are integrally formed.

4. The ball joint according to claim 1, wherein the thermal caulking member and the holding member are integrally formed.

5. The ball joint according to claim 4, wherein the holding member is formed so that the cross section area of the holding member is equal or greater than the total cross section area of the thermal caulking member in a lateral direction with respect to the height direction of the concave bearing member.

6. The ball joint according to claim 1, wherein each convex backup member is formed so that the ratio of the height to the width of the convex backup member is not less than 1.0 and not greater than 2.0.

7. The ball joint according to claim 1, wherein the concave bearing member is provided with a plurality of protruding portions, the concave bearing member and the plurality of protruding portions are integrally formed, and each plural protruding portion is closely fitted within a respective one of the plurality of slits.

* * * * *